United States Patent
Endoh et al.

(10) Patent No.: US 12,238,008 B2
(45) Date of Patent: Feb. 25, 2025

(54) COMMUNICATION TEST DEVICE AND COMMUNICATION TEST METHOD

(71) Applicant: Hitachi, Ltd., Tokyo (JP)

(72) Inventors: Hiromichi Endoh, Tokyo (JP); Tatsuya Maruyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 370 days.

(21) Appl. No.: 17/911,976

(22) PCT Filed: Sep. 1, 2020

(86) PCT No.: PCT/JP2020/033010
§ 371 (c)(1),
(2) Date: Sep. 15, 2022

(87) PCT Pub. No.: WO2021/186763
PCT Pub. Date: Sep. 23, 2021

(65) Prior Publication Data
US 2023/0009780 A1    Jan. 12, 2023

(30) Foreign Application Priority Data

Mar. 19, 2020    (JP) .................................. 2020-049193

(51) Int. Cl.
*H04L 47/24* (2022.01)
*H04L 9/40* (2022.01)
*H04L 47/20* (2022.01)

(52) U.S. Cl.
CPC .............. *H04L 47/24* (2013.01); *H04L 47/20* (2013.01); *H04L 63/1433* (2013.01)

(58) Field of Classification Search
CPC ...... H04L 47/24; H04L 47/20; H04L 63/1433
(Continued)

(56) References Cited

U.S. PATENT DOCUMENTS

| 5,671,224 | A | * | 9/1997 | Pyhalammi | ......... | H04L 12/4625 370/444 |
| 2003/0045285 | A1 | * | 3/2003 | Parkman | ............ | H04B 7/18508 455/428 |

(Continued)

FOREIGN PATENT DOCUMENTS

| EP | 1418709 A1 | * | 5/2004 | ......... | H04L 12/5693 |
| JP | 2006-236080 A | | 9/2006 | | |

(Continued)

OTHER PUBLICATIONS

European Search Report issued in corresponding EP Application No. 20925473.9., dated Dec. 1, 2023 (11 pages).
Iwasawa et al., "Low and Deterministic Latency Firewall for Cybersecurity in Real-time Control Systems", Proceedings of the Society of Instrument and Control Engineers, vol. 56, No. 2, Feb. 15, 2020 (13 pages).

(Continued)

*Primary Examiner* — Ruolei Zong
(74) *Attorney, Agent, or Firm* — Foley & Lardner LLP

(57) ABSTRACT

A communication test device may comprise a reception portion that receives a non-priority frame that may be divided into a plurality of fragments and a priority frame that is not divided as communication frames, a test portion that tests the communication frames in accordance with a predefined test rule and determines whether the communication frame is an invalid frame, a hold portion that holds status information indicating a status of the test by the test portion, a transmission portion that transmits the communication frame tested in the test portion, and/or an interception control portion that controls interception of the communication frame based on a determination result of the test portion.

8 Claims, 6 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2004/0170182 A1* | 9/2004 | Higashida | H04L 47/50 |
| | | | 370/473 |
| 2007/0189305 A1* | 8/2007 | Fujimoto | H04L 47/10 |
| | | | 370/395.42 |
| 2007/0285857 A1* | 12/2007 | Berkowitz | H02H 7/30 |
| | | | 361/64 |
| 2013/0016724 A1 | 1/2013 | Thaler | |
| 2013/0235878 A1* | 9/2013 | Hirota | H04J 3/0667 |
| | | | 370/412 |

FOREIGN PATENT DOCUMENTS

| | | | | |
|---|---|---|---|---|
| JP | 2017-092755 A | 5/2017 | | |
| WO | WO-2004036840 A1 * | 4/2004 | ......... | H04L 63/0227 |

OTHER PUBLICATIONS

Kang et al. "FPGA-based Real-time Abnormal Packet Detector for Critical Industrial Network", IEEE ISCC, Workshop on Communications in Critical Embedded Systems, Jun. 29, 2019, pp. 1199-1202.

International Search Report with English Translation and Written Opinion issued in corresponding International Application No. PCT/JP2020/033010 dated Dec. 1, 2020.

* cited by examiner

COMMUNICATION TEST DEVICE AND COMMUNICATION TEST METHOD

TECHNICAL FIELD

The present disclosure relates to a communication test device and a communication test method.

BACKGROUND ART

Communication test devices that test communication frames in accordance with predefined test rules are known for, e.g., interception of invalid data.

Additionally, in a control system having a control device that controls various devices such as in-vehicle systems and industrial control systems, real-time performance for communications is important. Therefore, in a communication test device used in the control system, it is necessary to minimize a delay time due to tests of communication frames and to ensure real-time performance for communications.

In contrast, Patent Literature 1 discloses a network monitor device that performs virus detections using a stream technique capable of performing virus detections of a large data volume in a short time when real-time performance for communications is required.

CITATION LIST

Patent Literature

Patent Literature 1
  Japanese Unexamined Patent Application Publication No. 2017-092755

SUMMARY OF INVENTION

Technical Problem

Recent years, some network standards for ensuring real-time performance provides a priority frame and a non-priority frame as communication frames, such as the TSN (Time Sensitive Networking) defined by IEEE Std 802.1 Qbu™-2016, IEEE Std 802.3br™-2016, etc. In these types of network standards, a transmitter interrupts transmission of a non-priority frame to preferentially transmit a priority frame at a timing of transmission of the priority frame even while the non-priority frame is being transmitted. Additionally, when transmission of the priority frame is completed, the transmitter transmits a continuation of the interrupted non-priority frame.

Patent Literature 1 does not describe any network standard in which the priority frame and the non-priority frame are provided as communication frames. It is difficult to apply the technology described in Patent Literature 1 to this type of network standard.

An object of the present disclosure is to provide a communication test device and a communication test method that are able to provide both real-time performance and security of communications even when a priority frame and a non-priority frame are provided as communication frames.

Solution to Problem

A communication test device according to one aspect of the present disclosure includes: a reception portion that receives a non-priority frame that may be divided into multiple fragments and a priority frame that is not divided as communication frames; a test portion that tests the communication frames in accordance with a test rule predefined and determines whether the communication frames are invalid frames; a hold portion that holds status information indicating a status of the test by the test portion; a transmission portion that transmits the communication frames tested in the test portion; and an interception control portion that controls interception of the communication frames based on determination results of the test portion. When the reception portion receives the fragment, the test portion tests the fragment to test the non-priority frame. When the test on the fragment is ended, the test portion interrupts the test on the non-priority frame. When the reception portion receives a fragment next to the above fragment, the test portion resumes the test on the non-priority frame based on the status information.

Advantageous Effects of Invention

According to the present disclosure, even when a priority frame and a non-priority frame are provided as communication frames, it becomes possible to provide both the real-time performance and security of communications.

DESCRIPTION OF EMBODIMENTS

Hereinafter, embodiments of the present disclosure are described with reference to the drawings.

First Embodiment

Figure 1:
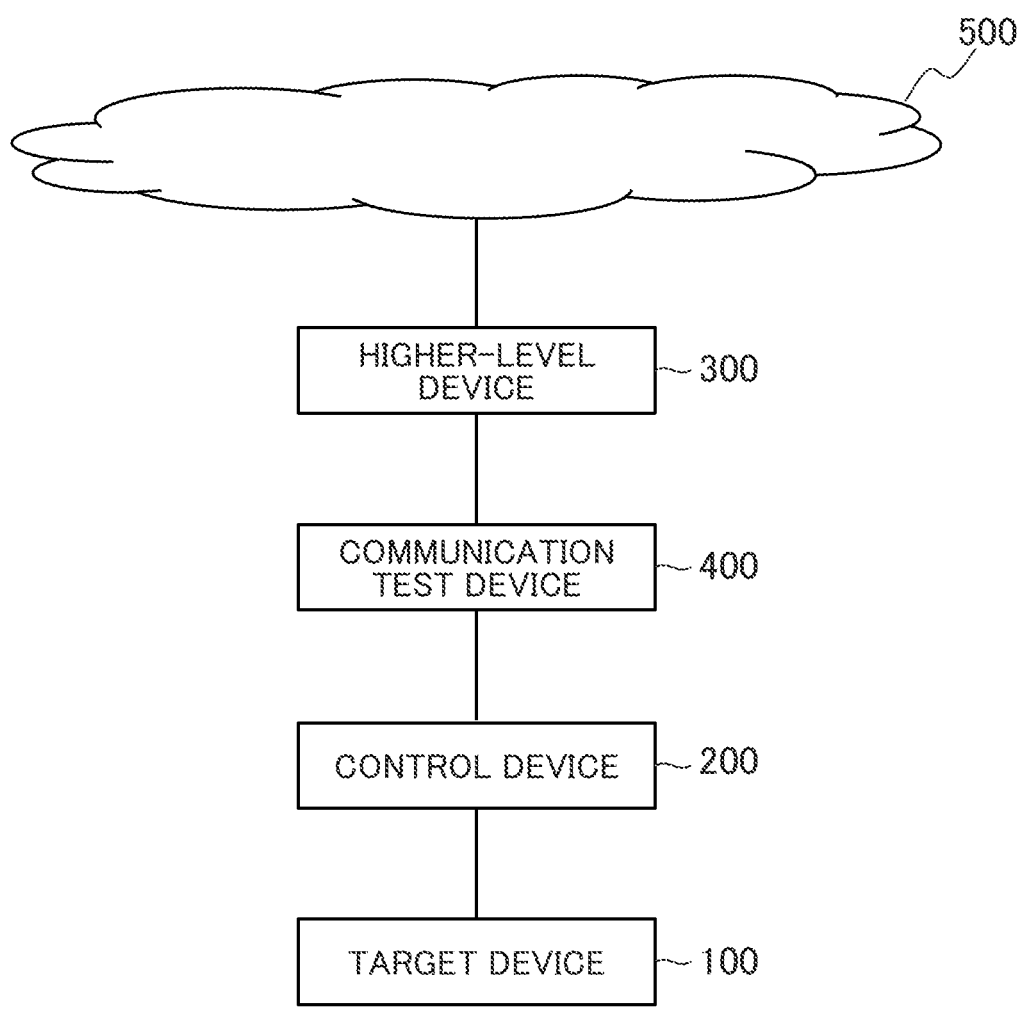
FIG. 1 is a diagram illustrating an example of an information system of First Embodiment of the present disclosure.

FIG. 1 is a diagram illustrating an example of an information system of First Embodiment of the present disclosure. The information system illustrated in FIG. 1, for example, includes an industrial IoT (Internet of Things) system in which control and sensing of a device are mixed, a system for autonomous operation of a device, or a control system for controlling a device in a plant etc. As illustrated in FIG. 1, the information system has a target device 100, a control device 200, a higher-level device 300, and a communication test device 400. Additionally, in the example of the diagram, the higher-level device 300 is connected to a cloud 500.

The target device 100 is a device to be controlled by the control device 200, such as a camera, a motion sensor, a robot, an AGV (Automated Guided Vehicle: unmanned vehicle), etc. The control device 200 is a controller that controls the target device 100. The higher-level device 300 performs, e.g., surveillance and control for the target device 100 and the control device 200 and information collection using the target device 100 and the control device 200.

The communication test device 400 is a device provided between the control device 200 and the higher-level device 300 to test data communicated between the control device 200 and the higher-level device 300 in each communication frame.

Figure 2:
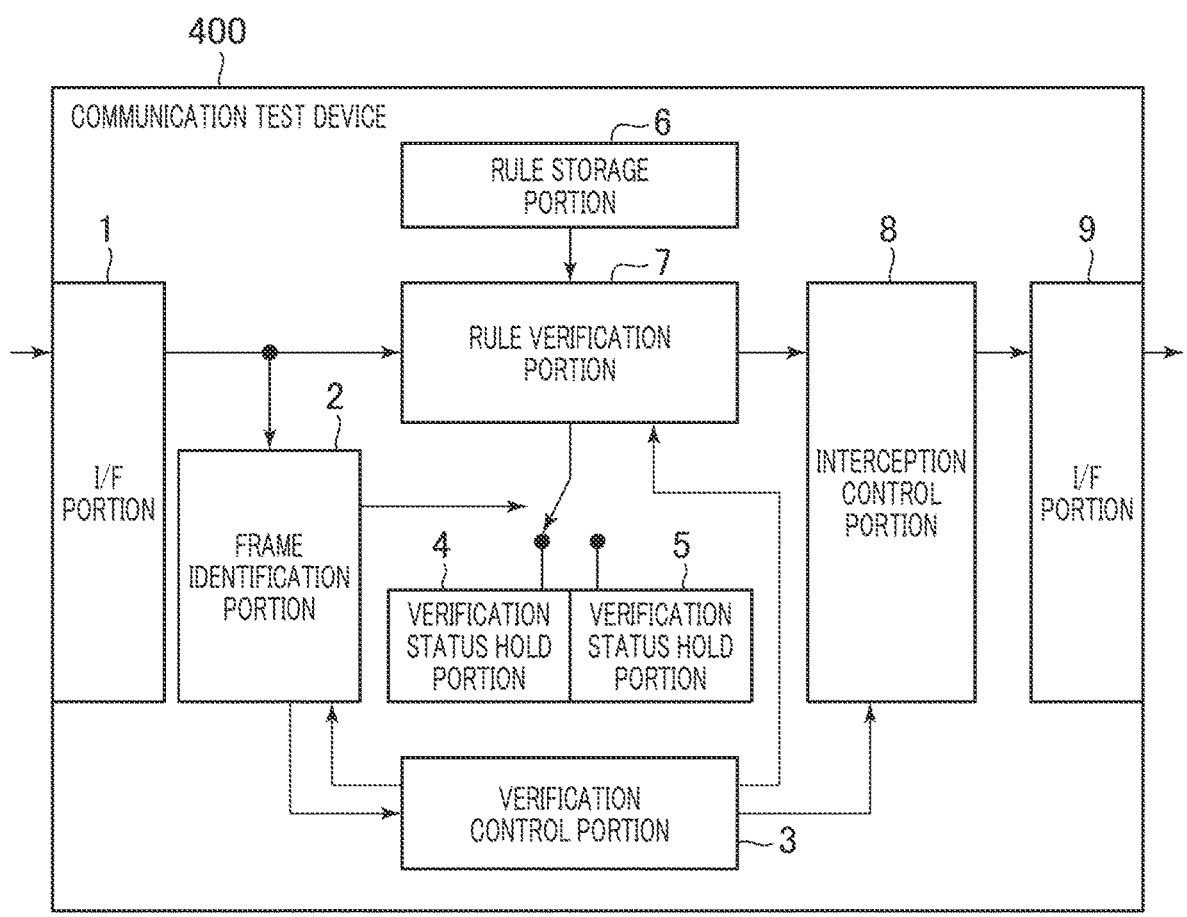
FIG. 2 is a diagram illustrating an example of a configuration of a communication test device of First Embodiment of the present disclosure.

FIG. 2 is a diagram illustrating an example of a configuration of the communication test device 400. The communication test device 400 illustrated in FIG. 2 has an I/F portion 1, a frame identification portion 2, a verification control portion 3, verification status hold portions 4 and 5, a rule storage portion 6, a rule verification portion 7, an interception control portion 8, and an I/F portion 9. It is noted that, in the following, an example of tests on the communication frames transmitted from the higher-level device 300 to the control device 200 is explained. This is the same as that on the communication frames transmitted from the control device 200 to the higher-level device 300.

The I/F portion 1 is a reception portion that receives communication data from an external device (the higher-level device 300 of FIG. 1 in the present embodiment). The communication data includes a priority frame and a non-priority frame as communication frames.

The priority frame is a communication frame transmitted preferentially to the non-priority frame, and for example, is a communication frame where real-time performance is required. The communication frame where real-time performance is required is, for example, a communication frame for performing control (for example, emergency stop etc.) of the control device 200. The non-priority frame is a communication frame with a lower priority than the priority frame, and for example, is a communication frame where real-time performance is not required. The communication frame where real-time performance is not required includes, for example, a communication frame for updating functions of the target device 100 and the control device 200 and image information acquired in the target device 100.

Figure 3:
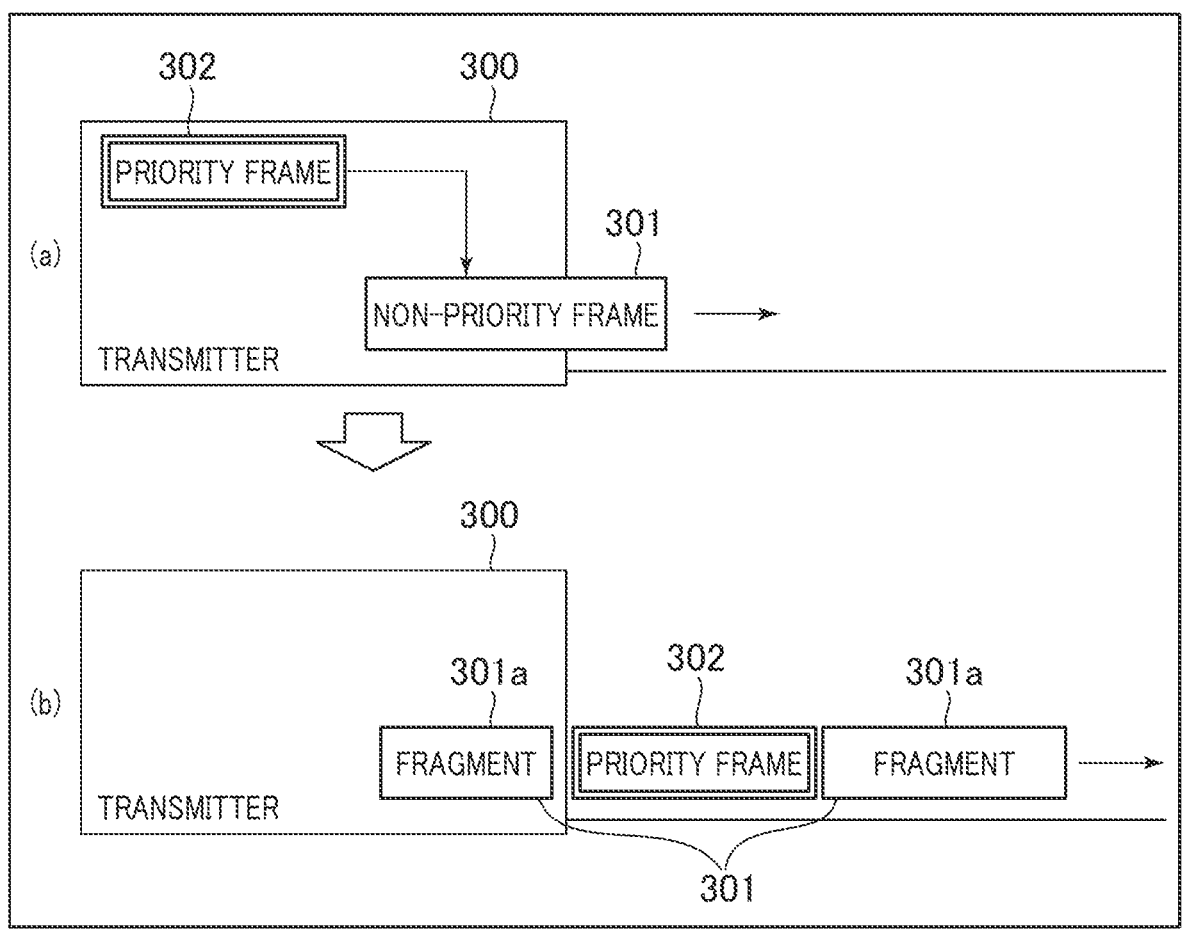
FIG. 3 is a diagram for explaining a priority frame and a non-priority frame.

FIG. 3 is a diagram for explaining the priority frame and the non-priority frame. In FIG. 3, a transmitter that transmits the priority frames and the non-priority frames is used as the higher-level device 300.

As illustrated in FIG. 3(*a*), in the higher-level device 300, it is assumed that a non-priority frame 301 is being transmitted. Currently, at a transmission timing of a priority frame 302, the higher-level device 300 interrupts transmission of the non-priority frame 301, and as illustrated in FIG. 3(*b*), preferentially transmits the priority frame 302. After that, when the transmission of the priority frame 302 is completed, the higher-level device 300 transmits continuation of the interrupted non-priority frame 301. Therefore, the non-priority frame 301 may be divided into multiple fragments (division frame) 301*a* and transmitted. In this case, the priority frame 302 is transmitted between two fragments 301*a*. It is noted that the priority frame 302 is not divided.

Depending on the transmission timing of the priority frame 302, multiple priority frames 302 may be transmitted while one non-priority frame 301 is being transmitted. In this case, the non-priority frame 301 may be divided into three or more fragments 301*a*, or the multiple priority frames 302 may be transmitted between two fragments 301*a*. Additionally, among multiple fragments 301*a*, the first transmitted fragment may be called a first fragment, the last transmitted fragment may be called a last fragment, and the fragment transmitted between the first fragment and the last fragment may be called an intermediate fragment. The first fragment includes first fragment information indicating that this fragment is the first fragment. The last fragment includes last fragment information indicating that this fragment is the last fragment.

The network standard that transmits the non-priority frame 301 and the priority frame 302 as above includes for example, the TSN.

Returning to the explanation of FIG. 2, the frame identification portion 2 is an identification portion that identifies a type of the communication frame received by the I/F portion 1. For example, the frame identification portion 2 checks a header of the communication frame to identify whether the communication frame is the priority frame or the non-priority frame.

In accordance with an identification result by the frame identification portion 2, the verification control portion 3 switches operation states of the communication test device 400 (specifically, operation states of the frame identification portion 2, the rule verification portion 7, and the interception control portion 8).

In the present embodiment, the operation states include an initial state in which the I/F portion 1 does not receive the communication frame, a priority verification state that tests (verifies) the priority frame, a non-priority verification state that tests the non-priority frame, and a standby state that waits for a next fragment of the non-priority frame. In this case, for example, when the communication frame is identified as the priority frame in the frame identification portion 2, the verification control portion 3 sets the operation state to the priority verification state, and when the communication frame is identified as the non-priority frame in the frame identification portion 2, the verification control portion 3 sets the operation state to the non-priority verification state.

The verification status hold portions 4 and 5 are hold portions holding the status information that indicates statuses of tests on the communication frames received by the I/F portion 1. Specifically, the verification status hold portion 4 is a priority frame hold portion holding priority frame status information that indicates statuses of tests on the priority frames as status information. The verification status hold portion 5 is a non-priority frame hold portion holding non-priority frame status information that indicates statuses of tests on the non-priority frames as status information.

The rule storage portion 6 is a storage portion that stores test rules for testing the communication frames received by the I/F portion 1. In the present embodiment, the test rules are predefined. Additionally, the test rules in the present embodiment include an extraction condition that defines a rule for extracting a characteristic value of a communication frame from the communication frame and a comparison condition that defines a comparison target with which the characteristic value extracted from the communication frame is verified (compared). It is noted that multiple test rules (a pair of the extraction condition and the comparison condition) may be provided.

The rule verification portion 7 is a test portion that tests the communication frame received by the I/F portion 1 in accordance with the test rule stored in the rule storage portion 6 to determine whether the communication frame is an invalid frame.

Based on the determination result of the rule verification portion 7, the interception control portion 8 controls interception of the communication frame received by the I/F portion 1. In the present embodiment, when the communication frame is determined to be an invalid frame in the rule verification portion 7, the interception control portion 8 transmits interception information that the communication frame is targeted for interception to a device (the control device 200 in the present embodiment) that is a destination of the communication frame. At this time, for example, the interception control portion 8 may change a part of the communication frame (for example, an FCS (Frame Check Sequence) portion of the end, etc.) determined to be an invalid frame to an interception indication value indicating that the communication frame is an interception target to transmit the interception information, or may transmit an invalid notice frame different from the communication frame determined to be an invalid frame as the interception information. In this case, for example, in the control device 200 that is a destination of the communication frame, the communication frame determined to be an invalid frame is intercepted based on the interception information.

The I/F portion 9 is a transmission portion that transmits the communication frame tested in the rule verification portion 7 to an external device (the control device 200 in the present embodiment).

Figure 4:
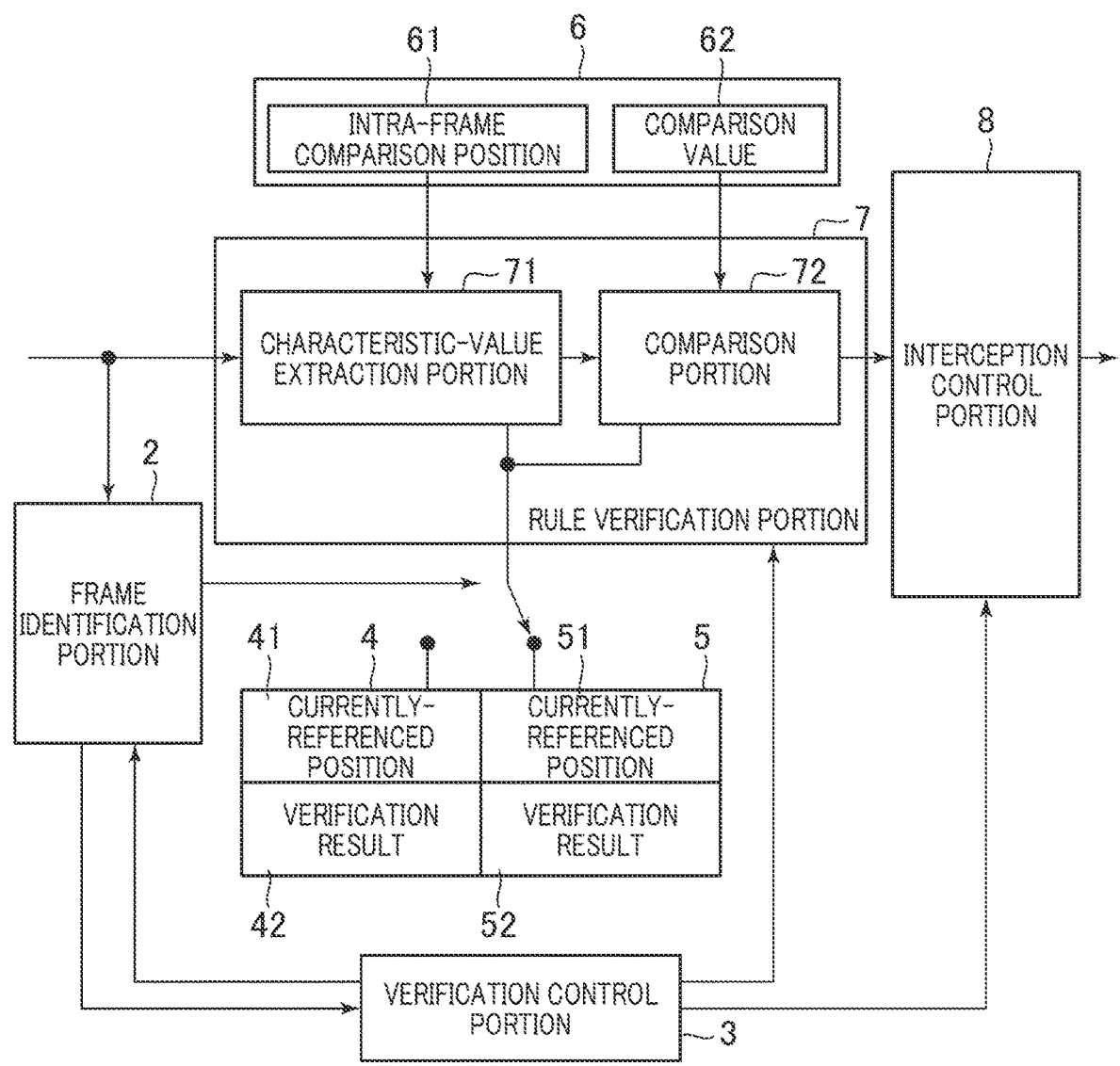
FIG. 4 is a diagram for explaining an example of test processing that tests a communication frame.

FIG. 4 is a diagram for explaining an instance of test processing that tests communication frames. In the example of FIG. 4, the verification status hold portion 4 holds a currently-referenced position 41 and a verification result 42 as status information. The verification status hold portion 5 holds a currently-referenced position 51 and a verification result 52 as status information. The rule storage portion 6 stores an intra-frame comparison position 61 and a comparison value 62 as a test rule. The rule verification portion 7 has a characteristic-value extraction portion 71 and a comparison portion 72.

The intra-frame comparison position 61 is an example of the extraction condition, and is a position where a characteristic value in the communication frame is extracted. The comparison value 62 is an example of the comparison condition, and is a value to be compared (verified) with the characteristic value. In the present embodiment, multiple intra-frame comparison positions 61 are provided. The comparison value is present in each intra-frame comparison position 61. These comparison values indicate, for example, a source of a communication frame, an address of a destination, or a pattern (for example, a virus pattern) characteristic in invalid data etc.

The characteristic-value extraction portion 7 references values of the communication frame from the beginning, and makes the verification status hold portion 4 or 5 hold the reference position as the currently-referenced position 41 or 51. Specifically, when the operation state is in the priority verification state, the characteristic-value extraction portion 71 makes the verification status hold portion 4 hold the reference position as the currently-referenced position 41. The operation state is in the non-priority verification state. The verification status hold portion 5 is made to hold the reference position as the currently-referenced position 51. Then, when the reference position matches the intra-frame comparison position 61, the characteristic-value extraction portion 71 extracts a value of the intra-frame comparison position 61 from the communication frame as the characteristic value.

The comparison portion 72 compares the characteristic value extracted by the characteristic-value extraction portion 71 to the comparison value 62 in each intra-frame comparison position 61, and makes the verification status hold portion 4 or 5 hold the verification result as the verification result 42 or 52. Specifically, when the operation state is in the priority verification state, the characteristic-value extraction portion 71 makes the verification status hold portion 4 hold the verification result as the verification result 42, and when the operation state is in the non-priority verification state, makes the verification status hold portion 5 hold the verification result as the verification result 52.

When the reference of the communication frame by the characteristic-value extraction portion 71 is completed, the comparison portion 72 determines whether the communication frame is an invalid frame based on the verification result 42 or 52. Specifically, when the operation state is in the priority verification state, the comparison portion 72 determines whether the communication frame is an invalid frame based on the verification result 42, and when the operation state is in the non-priority verification state, determines whether the communication frame is an invalid frame based on the verification result 52.

In the test processing explained above, when the communication frame is a fragment of the non-priority frame, the rule verification portion 7 may be unable to acquire the verification result 52 needed to determine whether the communication frame is an invalid frame and thus unable to determine whether the communication frame is an invalid frame.

Therefore, the rule verification portion 7 interrupts the test on the non-priority frame when ending the test on the fragment, and in the interruption state, conducts the test on the priority frame next received by the I/F portion 1. subsequently, when the test on the priority frame is completed and the I/F part 1 then receives the next fragment, the rule verification portion 7 resumes the test on the non-priority frame based on the status information (the currently-referenced position 51 and the verification result 52) held in the verification status hold portion 5.

Figure 5:
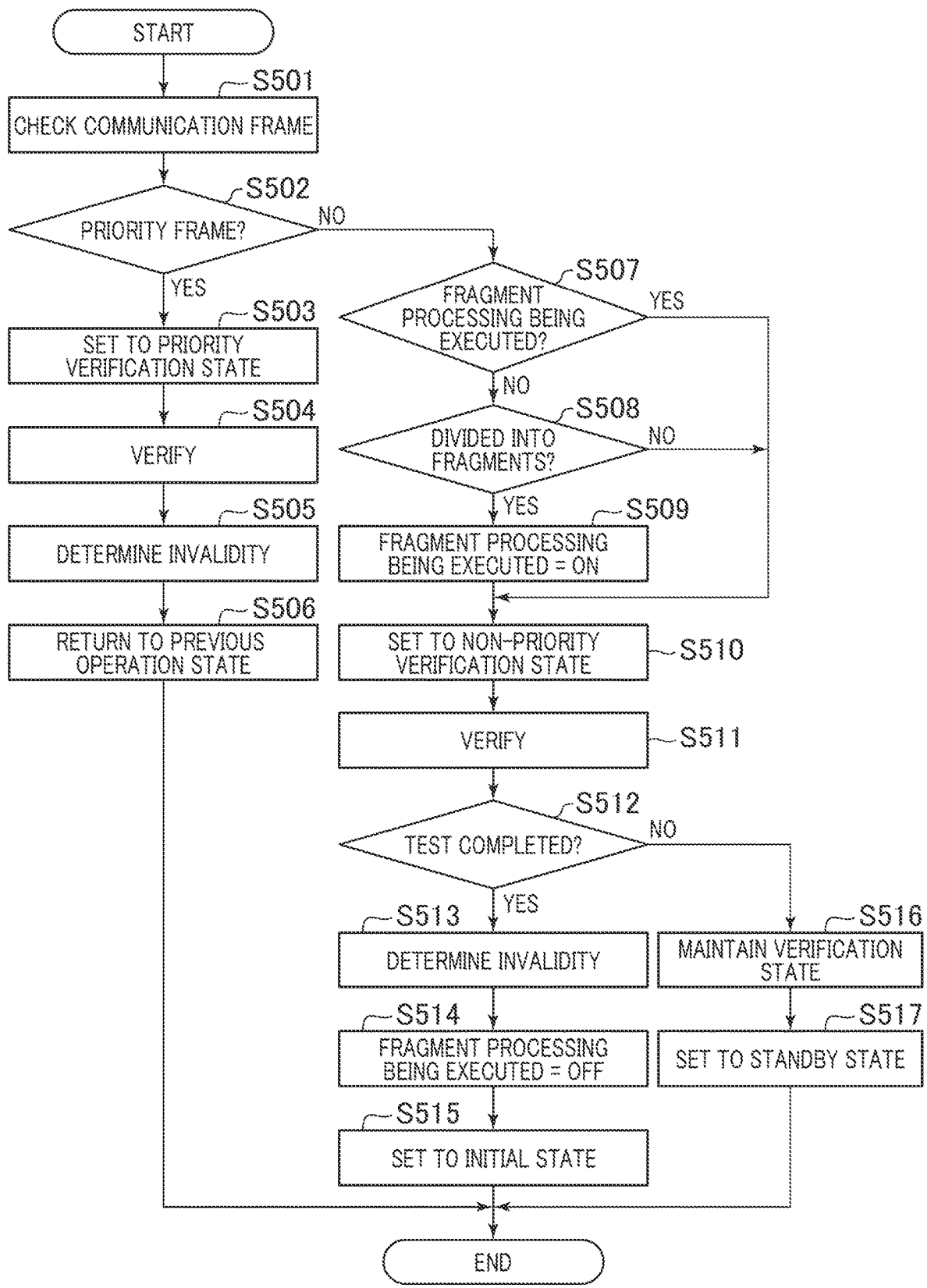
FIG. 5 is a flowchart for explaining an example of operation of the communication test device of First Embodiment of the present disclosure.

FIG. 5 is a flowchart for explaining an example of operation of the communication test device 400.

The operation state of the communication test device 400 is assumed to be in the initial state or the standby state. At this time, when the I/F portion 1 receives a communication frame, the frame identification portion 2 checks a header of the communication frame (Step S501), and determines whether the communication frame is the priority frame (Step S502).

When the communication frame is the priority frame (Step S502: Yes), the verification control portion 3 sets the operation state to the priority verification state. When the operation state is set to the priority verification state, the frame identification portion 2 sets the verification status hold portion 4 to a usage hold portion used in the rule verification portion 7 (Step S503). The characteristic-value extraction portion 71 of the rule verification portion 7 verifies the priority frames based on the test rule (extraction condition) stored in the rule storage portion 6 while holding the status information in the verification status hold portion 4 that is the usage hold portion (Step S504).

When the verification is completed, the comparison portion 72 of the rule verification portion 7 determines whether the priority frame is an invalid frame based on the status information held in the verification status hold portion 4. When the priority frame is an invalid frame, the interception control portion 8 transmits interception information and the priority frame via the I/F portion 9, and when the priority frame is not the invalid frame, transmits the priority frame via the I/F portion 9 (Step S505). Then, the verification control portion 3 removes the status information held in the verification status hold portion 4, returns the operation state to the original initial state or the standby state (Step S506), and ends the processing.

Additionally, when the communication frame is not the priority frame (Step S502: No), that is, when the communication frame is determined to be the non-priority frame, the verification control portion 3 checks whether the communication test device 400 is executing the fragment processing (Step S507). The fragment processing is processing corresponding to the status where the non-priority frame is divided into multiple fragments. In the present embodiment, the verification control portion 3 holds a fragment processing flag that indicates whether the fragment processing is in process, and checks whether the fragment processing is in process based on the fragment processing flag.

When the fragment processing is not in process (Step S507: No), the frame identification portion 2 determines whether the non-priority frame is divided into fragments (Step S508). In the present embodiment, the frame identification portion 2 checks whether first fragment information is included in the non-priority frame, determines that the non-priority frame is divided into fragments when the first fragment information is included, and determines that the non-priority frame is not divided into fragments when the first fragment information is not included.

When the non-priority frame is divided into fragments (Step S508: Yes), the verification control portion 3 turns ON the fragment processing flag and moves to the fragment processing (Step S509).

When Step S509 is completed, when the fragment processing is in process (Step S507: Yes), and when the non-priority frame is not divided into fragments (Step S508: No), the verification control portion 3 sets the operation state to the non-priority verification state. When the operation state is set to the non-priority verification state, the frame identification portion 2 sets the verification status hold portion 5 as the usage hold portion (Step S510). The characteristic-value extraction portion 71 of the rule verification portion 7 verifies the non-priority frame in accordance with the test rule (extraction condition) stored in the rule storage portion 6 while holding the holding status information in the verification status hold portion 5 that is the usage hold portion (Step S511).

When the verification is completed, the comparison portion 72 of the rule verification portion 7 determines whether to end the test on the non-priority frame (Step S512). Specifically, when the fragment processing is not in process or when the fragment processing is in process and the last fragment information is included in the non-priority frame, the comparison portion 72 determines to end the test on the non-priority frame, and when the processing fragment is in process and the last fragment information is not included in the non-priority frame, the comparison portion 72 determines not to end the test on the non-priority frame.

When the test on the non-priority frame is ended (Step S512: Yes), the comparison portion 72 determines whether the non-priority frame is an invalid frame based on the status information held in the verification status hold portion 5. When the non-priority frame is an invalid frame, the interception control portion 8 transmits interception information and the non-priority frame via the I/F portion 9, and when the non-priority frame is not an invalid frame, transmits the non-priority frame via the I/F portion 9 (Step S513).

Then, the verification control portion 3 turns OFF the fragment processing flag, and ends the fragment processing (Step S514). Further, the verification control portion 3 removes the status information held in the verification status hold portion 5, sets the operation state to the initial state (Step S515), and ends the Processing. It is noted that, when the non-priority frame is not divided into multiple fragments, that is, when the fragment processing is not in process, the processing of Step S514 may be skipped.

Additionally, when the test on the non-priority frame is not ended (Step S512: No), that is, when the test on the non-priority frame is interrupted, the comparison portion 72 makes the verification status hold portion 5 maintain holding of the status information (Step S516). Then, the verification control portion 3 sets the operation state to the standby state (Step S517), and ends the processing.

In the operation explained above, when the non-priority frame is divided into multiple fragments, that is, when the fragment processing is in process, the rule verification portion 7 determines whether the non-priority frame is an invalid frame after verification of the last fragment is completed. however, the timing to determine whether the non-priority frame is an invalid frame is not limited to this example.

The rule verification portion 7 may be able to determine whether the non-priority frame is an invalid frame in the first fragment or intermediate fragment before the I/F portion 1 receives the last fragment. For example, in the first fragment or intermediate fragment, when verification between the characteristic values and the comparison values at all the intra-frame comparison positions is completed, the rule verification portion 7 can determine whether the non-priority frame is an invalid frame based on that verification result.

Therefore, the comparison portion 72 of the rule verification portion 7 may determine whether the non-priority frame is an invalid frame based on the status information held in the verification status hold portion 5 each time the verification (test) to the fragment ends. In this case, the interception control portion 8 may transmit interception information at the timing at which the non-priority frame is determined to be an invalid frame. For example, the interception control portion 8 changes a part of the fragment when the non-priority frame is determined to be an invalid frame into an interception indication value.

Additionally, the interception control portion 8 may provide a dummy last fragment information to the fragment when the non-priority frame is determined to be an invalid frame and transmit the fragment as the last fragment. In this case, the rule verification portion 7 discards the fragment received by the I/F portion 1 after determining the non-priority frame as an invalid frame.

According to the present embodiment described above, when the I/F portion 1 receives the fragment of the non-priority frame, the rule verification portion 7 tests the fragment to test the non-priority frame. When the test on the fragment is ended, the rule verification portion 7 interrupts the test on the non-priority frame. When the I/F part 1 receives the next fragment, the rule verification portion 7 resumes the test on the non-priority frame based on the status information. Therefore, even when the priority frame and the non-priority frame are provided as communication frames, it becomes possible to provide both the real-time performance and security of communications.

Additionally, in the present embodiment, the rule verification portion 7 tested the priority frame between two fragments different from each other while interrupting the test on the non-priority frame. Therefore, even when the priority frame is transmitted while interrupting the test on the non-priority frame, it becomes possible to provide both the real-time performance and security of communications.

Additionally, in the present embodiment, the interception control portion 8 transmits the interception information that the communication frame is targeted for interception When the communication frame is an invalid frame. Since it becomes possible to discard the invalid frame in a device that is a destination of the communication frame, it becomes possible for the communication test device 400 to suppress the latency of the communication frame.

Additionally, in the present embodiment, the rule verification portion 7 determines whether the communication frame is an invalid frame based on the status information each time the test on the fragment ends. The interception control portion 8 transmits the interception information at the timing at which the communication frame is determined to be an invalid frame. In this case, since it becomes possible to transmit the interception information before receiving the last fragment, it becomes possible for the communication test device 400 to suppress the latency of the communication frame.

Additionally, in the present embodiment, the I/F portion 9 transmits the fragment when the communication frame is determined to be an invalid frame as the last fragment of the non-priority frame. The rule verification portion 7 discards the fragment received by the above I/F portion 1 after determining the communication frame to be an invalid frame. In this case, in the device that is a destination of the communication frame, since it becomes unnecessary to wait for timeout of the fragment after the communication frame is determined to be an invalid frame, it becomes possible to reduce load.

Additionally, in the present embodiment, the rule verification portion 7 may determine whether the communication frame is an invalid frame when all the tests on all the fragments of the non-priority frame are completed. In this case, it becomes possible to make high the flexibility of the test algorithm that tests the non-priority frames. As a result, for example, it becomes possible to realize cost reduction.

It is noted that, in the present embodiment, the priority of the communication frame is set to have two levels. The communication test device 400 is applicable to a communication method in which the priority has three or more levels and a higher priority frame is able to interrupt a lower priority frame and to be transmitted. For example, in the communication method where three types of frames including a first priority frame, a second priority frame, and a non-priority frame are defined in descending order of priority, the configuration is that the verification status hold portion 4 is assigned to the first priority frame that is not interrupted and the verification status hold portion 5 is assigned to each of the second priority frame and the non-priority frame that may be divided by interruption. After the test on one fragment is ended, each verification status hold portions 5 is made to hold the status information to interrupt the test on the second priority frame or the non-priority frame. When the next fragment is received, the test is resumed with reference to the held status information.

Second Embodiment

Hereinafter, a different point from First Embodiment is mainly explained.

Figure 6:
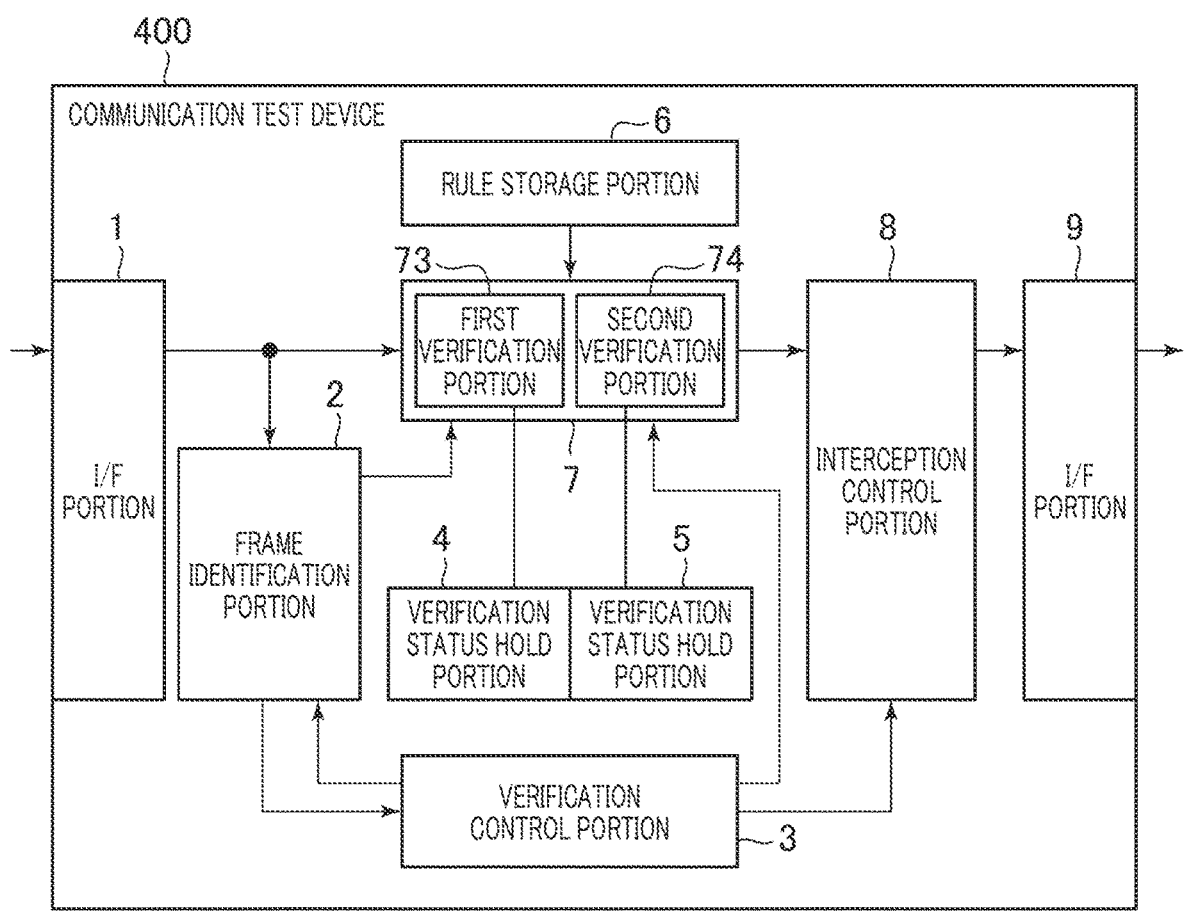
FIG. 6 is a diagram illustrating an example of a configuration of a communication test device of Second Embodiment of the present disclosure.

FIG. 6 is a diagram illustrating an example of a configuration of the communication test device 400 of the present embodiment. The communication test device 400 illustrated in FIG. 6 differs from the communication test device 400 of First Embodiment illustrated in FIG. 2 in that the rule verification portion 7 has a first verification portion 73 and a second verification portion 74.

The first verification portion 73 is a priority frame test portion that tests the priority frame based on the test rule stored in the rule storage portion 6 while holding the status information in the verification status hold portion 4 when the communication frame received by the I/F portion 1 is the priority frame. When the test on the priority frame is completed, the first verification portion 73 determines whether the priority frame is an invalid frame based on the status information held in the verification status hold portion 4.

The second verification portion 74 is a priority frame test portion that tests the non-priority frame in accordance with the test rule stored in the rule storage portion 6 while holding the status information in the verification status hold portion 5 when the communication frame received by the I/F portion 1 is the non-priority frame. When the test on the non-priority frame is completed, the second verification portion 74 determines whether the non-priority frame is an invalid frame based on the status information held in the verification status hold portion 5. It is noted that the processing when the non-priority frame is divided into multiple fragments is the same as that of the rule verification portion 7 of First Embodiment.

It is noted that the first verification portion 73 and the second verification portion 74 may have the same configurations as the characteristic-value extraction portion 71 and the comparison portion 72 illustrated in FIG. 4, respectively.

In case of the present embodiment, since the first verification portion 73 may use the verification status hold portion 4 in the fixed manner and the first verification portion 74 may use the verification status hold portion 5 in the fixed manner, it is not necessary for the frame identification portion 2 to switch the usage hold portions. Instead, the frame identification portion 2 operates any one of the first verification portion 73 and the second verification portion 74 in accordance with the operation state. Specifically, when the operation state is in the priority verification state, the frame identification portion 2 operates the first verification portion 73, and when the operation state is in the non-priority verification state, operates the second verification portion 74.

As explained above, according to the present embodiment, since the first verification portion 73 that tests the priority frames and the second verification portion 74 that tests the non-priority frames are provided separately, it becomes possible to make high the flexibility of the test algorithm that tests the communication frames.

Each embodiment of the present disclosure mentioned above is an illustration for explanation of the present disclosure, and is not intended to limit the range of the present disclosure only to those embodiments. The persons skilled in the art are able to carry out the present disclosure in other various aspects without deviating from the range of the present disclosure.

For example, the interception control portion 8 may actually intercept the communication frame determined to be an invalid frame.

LIST OF REFERENCE SIGNS

1: I/F portion
2: frame identification portion
3: verification control portion
4 to 5: verification status hold portion
6: rule storage portion
7: rule verification portion
8: interception control portion
9: I/F portion
41: currently-referenced position
42: verification result
51: currently-referenced position
52: verification result 61: intra-frame comparison position
62: comparison value
71: characteristic-value extraction portion
72: comparison portion

The invention claimed is:

1. A communication test device comprising:
a reception portion that receives a non-priority frame that may be divided into a plurality of fragments and a priority frame that is not divided as communication frames;
a test portion that tests the communication frames in accordance with a predefined test rule and determines whether the communication frame is an invalid frame;
a hold portion that holds status information indicating a status of the test by the test portion;
a transmission portion that transmits the communication frame tested in the test portion; and
an interception control portion that controls interception of the communication frame based on a determination result of the test portion;
wherein, when the reception portion receives the fragment, the test portion tests the fragment to test the non-priority frame, when ending the test on the fragment, interrupts the test on the non-priority frame, and when the reception portion receives a fragment next to the fragment, resumes the test on the non-priority frame based on the status information.

2. A communication test device according to claim 1 wherein
the reception portion receives the priority frame while receiving the two fragments that are different from each other, and
the test portion tests the priority frame while interrupting the test on the non-priority frame.

3. The communication test device according to claim 1 wherein
when the communication frame is an invalid frame, the interception control portion transmits interception information that the communication frame is targeted for interception.

4. The communication test device according to claim 3 wherein
the test portion determines whether the communication frame is an invalid frame based on the status information each time the test on the fragment ends, and the interception control portion transmits the interception information at a timing at which the communication frame is determined to be an invalid frame.

5. A communication test device according to claim 4 wherein
the transmission portion transmits the fragment when the communication frame is determined to be an invalid frame as a last fragment of the non-priority frame, and
the test portion discards the fragment received by the reception portion after determining the communication frame as an invalid frame.

6. The communication test device according to claim 1 wherein
the test portion determines whether the communication frame is an invalid frame when all tests on the plurality of fragments are completed.

7. The communication test device according to claim 3 wherein
the test portion includes:
a priority frame test portion that tests the priority frame and determines whether the priority frame is an invalid frame; and
a non-priority frame test portion that tests the non-priority frame and determines whether the non-priority frame is an invalid frame.

8. A method for testing communications comprising:
receiving a non-priority frame that may be divided into a plurality of fragments and a priority frame that is not divided as communication frames;
testing the communication frame in accordance with a predefined test rule to determine whether the communication frame is an invalid frame;
holding status information that indicates a status of the test;
transmitting the tested communication frame; and
controlling interception of the communication frame based on a determination result of the test portion,
wherein, in the test on the communication frame, when the fragment is received, the fragment is tested to test the non-priority frame,
when the test on the fragment is ended, the test on the non-priority frame is interrupted, and
when a fragment next to the fragment is received, the test on the non-priority frame is resumed based on the status information.

* * * * *